United States Patent [19]

Cowan

[11] 4,423,792

[45] Jan. 3, 1984

[54] ELECTRONIC SCALE APPARATUS AND METHOD OF CONTROLLING WEIGHT

[76] Inventor: Donald F. Cowan, 510 Erskine Dr., Pacific Palisades, Calif. 90212

[21] Appl. No.: 274,557

[22] Filed: Jun. 17, 1981

[51] Int. Cl.³ .................... G01G 19/44; G01G 23/00
[52] U.S. Cl. ........................................ 177/25; 177/1; 177/245
[58] Field of Search ................. 177/1, 25, 5, 245, 34

[56] References Cited

U.S. PATENT DOCUMENTS

| | | | |
|---|---|---|---|
| 3,967,690 | 7/1976 | Northcutt | 177/25 |
| 4,113,039 | 9/1978 | Ozaki et al. | 177/25 |
| 4,260,033 | 4/1981 | Kakuta et al. | 177/34 |
| 4,301,879 | 11/1981 | Dubow | 177/5 |
| 4,318,447 | 3/1982 | Northcutt | 177/25 |
| 4,325,441 | 4/1982 | Nakatani et al. | 177/245 X |
| 4,366,873 | 1/1983 | Levy et al. | 177/25 |

FOREIGN PATENT DOCUMENTS

2825095  3/1980  Fed. Rep. of Germany ........ 177/25

*Primary Examiner*—George H. Miller, Jr.
*Attorney, Agent, or Firm*—Robert J. Schaap

[57] ABSTRACT

An electronic scale apparatus which provides weight control information, and a method of controlling weight which employs a scale apparatus. The apparatus comprises a scale member for measuring the weight of a person at a selected point in time. An electrical signal is generated in response to the measured weight. The apparatus further includes a memory for storing weight information. This weight information may include a base weight introduced previously into the memory. The apparatus includes an electronic circuit in which the generated signal is processed so that the weight of the person at the selected point in time can be compared against the base weight. This circuit also enables the calculation of a weight change based on the comparison. A display member is operatively connected to the electronic circuit for displaying the calculated weight and/or percentage of a weight change to a selected goal. The apparatus may be provided with a plurality of manually operable switches for introducing base weight information or other forms of weight related information. Moreover, the apparatus may be provided with a plurality of display members for simultaneously displaying various forms of weight related information. The method of the invention which may utilize the apparatus, enables an individual to measure the weight over selected periods of time, receiving reinforcement for achieving a weight change, or to take corrective action based on the weight changes.

30 Claims, 6 Drawing Figures

ELECTRONIC SCALE APPARATUS AND METHOD OF CONTROLLING WEIGHT

BACKGROUND OF THE INVENTION

1. Field of the Invention

This invention relates in general to certain new and useful improvements in electronic scale apparatus and a method of controlling weight, and more particularly, to electronic scale apparatus which enables a comparison of a new weight against a previously determined base weight to provide weight differential information and where the method uses this information to enable the user to take corrective weight control action. The apparatus and method uses this information to also provide reinforcement to the user based on even small weight changes, e.g., one-half pound or take such corrective action.

2. Brief Description of the Prior Art

It has long been recognized that weight control is one important criteria in maintenance of health. The anorexic patient requires weight gain to maintain health while the overweight individual requires weight loss to remain healthy. Overeating or excess food intake has often been associated with a considerable portion of the population in many of the developed countries where food supplies are readily available. For example, it has been estimated that over fifty percent of the Americans are overweight.

There have also been many proposals for weight control which have been heretofore advanced. These proposals all generally rely upon some form of therapeutic treatment such as treatment by a therapist for treating the psychological conditions which might lead to overeating, group therapy treatments, and the like.

In most situations, the party attempting to exercise weight control utilizes a conventional scale such as a typical so-called "bathroom scale". In this way, the user may make a weight measurement and may write the weight down on a piece of paper or other record. The user repeats this procedure periodically to compare the new weight with a previous weight in order to determine if there was a weight loss and how much weight loss was obtained.

There are many problems associated with this form of maintaining weight control. First of all, if the user does not maintain an accurate record of periodic weights, or if he or she loses the record, then the program may be interrupted. Secondly, the user must calculate weight differentials and time periods in which remaining wight must be lost during a predetermined period of time. Further, there are no readily externally available psychological rewards which are obtained when one merely stands on a scale and observes his or her weight even though there may be a weight loss.

OBJECTS OF THE INVENTION

It is therefore, a primary object of the present invention to provide an electronic scale apparatus which is capable of calculating weight differentials based on weight inputs at different times and providing an output of weight related information.

It is another object of the present invention to provide an electronic scale apparatus of the type stated which includes an internal memory for storing weight information on a selected time basis and calculating weight output differentials and presenting the same on a display.

It is a further object of the present invention to provide an electronic scale apparatus of the type stated in which multiple displays are provided for simultaneously displaying various forms of weight-related information to enable a user to determine further courses of action for purposes of weight control and/or to encourage individuals to achieve realistic periodic weight change goals and reinforcement with even small weight changes such as one-half pound changes.

It is an additional object of the present invention to provide an electronic scale apparatus of the type stated which may be provided with manually operable switch input for introducing information as well as a scale input for analog signals which are converted to digital signals for use in calculating weight control information.

It is yet another object of the present invention to provide an electronic scale apparatus of the type stated which can be constructed at a relatively low unit cost and which is highly effective in assisting individuals in controlling weight.

It is still another object of the present invention to provide a method of controlling weight by using an electronic scale apparatus thereby enabling the user to quickly and readily determine weight control information on a time basis and determine a further course of action for purposes of weight control.

With the above and other objects in view, my invention resides in the novel feature of form, construction, arrangement and combination of parts presently described and pointed out in the claims.

SUMMARY OF THE DISCLOSURE

An electronic scale apparatus for providing weight control information. The apparatus comprises means for measuring weight at a selected point in time along with a signal generating means operatively connected to the means for measuring to thereby enable generation of an electrical signal in response to a measured weight.

The apparatus further includes a memory means for storing weight information including a base weight introduced into the memory means and against which a comparison can be made.

The electronic scale apparatus of the present invention also includes an electronic circuit means which is operatively connected to the signal generating means for receiving the generated electrical signal. The memory means forms part of the electronic circuit and an arithmatic control means is operatively connected to the memory means for calculating a weight change based on a comparison of the base weight which was previously introduced into the memory means with the weight represented by the electrical signal. The apparatus includes a display means which is operatively connected to the electrical circuit means for displaying the calculated weight change.

The electronic circuit means which may be considered to include the memory means, and the display means are preferably included within a wall housing which is separate from the means for measuring weight. In this latter embodiment, the means for measuring weight may be a scale provided with the necessary mechanisms for generating an analog signal in response to an individual standing on the scale. The analog signal would thereupon be transmitted to the housing of the wall mountable unit for conversion to a digital signal and further processing therein.

In one of the preferred embodiments of the invention, the apparatus preferably comprises a plurality of individual display members which are capable of being simultaneously operable for simultaneously displaying weight related information. Thus, for example, a first display member may display a total weight loss based on a previous initial starting weight and a second display member may disclose a weight loss over a period of time less than that from the starting weight. In like manner, other displays may disclose dates of program starts, present dates, goal weight losses, and the like.

In another embodiment of the invention, the housing may be provided with a plurality of manually actuable switches which are capable of being actuated by the user of the apparatus in order to introduce various forms of information, such as weight control information. For example, the user of the apparatus could introduce the number of weeks for a selected period in order to enable the apparatus to calculate the weight loss per week, or like information.

In another embodiment of the invention, the apparatus could be provided with a print-control circuit for enabling a print head to provide a printed record of the weight related information. Thus, for example, that information which is displayed on the various display members could also be printed on a printed record for the user.

In still another embodiment of the invention, the housing could be provided with a sound-generating means operatively connected to the electronic circuit for generating sounds corresponding to weight related information. Thus, for example, if the user reached a certain weight loss in a selected period of time, the sound generating means could generate a sound of applause or other forms of sound representing congratulations to the user thereof.

The apparatus of the invention would normally include input registers for receiving the information which may be introduced by the manually operable keyboard switches. Further, the analog signal from the scale would be introduced into an analog-digital converter and an input register which is capable of introducing the information into a read-only memory. The information introduced by the manually operable keyboard switches would also be introduced into a read-only memory. In like manner, the information introduced by the manually operable keyboard switches would also include an arithmatic control unit and a random access memory. Timing controls would also be provided.

The apparatus would also include in a preferred embodiment, a scanner decoder and a multiplexer for operating display registers which are, in turn, connected to the display members.

The invention possesses many other advantages and has other purposes which may be made more clearly apparent from a consideration of the forms in which it may be embodied. These forms are shown in the drawings forming and accompanying part of the present specification. They will now be described in detail for the purposes of illustrating the general principles of the invention, but it is to be understood that such detailed descriptions are not to be taken in a limiting sense.

BRIEF DESCRIPTION OF THE DRAWINGS

Having thus described the invention in general terms, reference will now be made to the accompanying drawings in which:

DETAILED DESCRIPTION OF PREFERRED EMBODIMENTS

Figure 1:
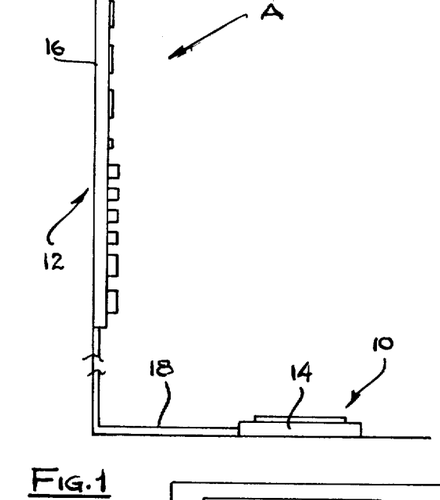
FIG. 1 is a side elevational view showing an electronic scale apparatus constructed in accordance with and embodying the present invention and which includes a wall mountable unit and a floor supported scale unit.

Referring now in more detail and by reference characters to the drawings which illustrate practical embodiments of the present invention, A designates an electronic scale apparatus comprising a scale unit 10 typically adapted for support on a floor or similar supporting surface. The apparatus also comprises a wall mountable unit 12, often referred to as a "display" unit.

The scale unit 10 comprises an outer casing 14 which retains a signal generating means as hereinafter described in more detail. The display unit 12 also is comprised of an outer housing 16 which is designated to contain all of the components which enable display of weight related information and may also contain all or a certain portion of the electronic circuit means. In the illustrated embodiment, the display unit 12 is separated from the scale unit 10 and only electrically connected thereto by means of electrical current carrying conductors 18. However, the display unit 12 could be physically connected to the scale unit 10 and movable therewith as an integral structure. In one of the preferred embodiments, the housing 12 is preferably a wall-mountable unit so as to enable the user to have the housing 16 located at face level in order to enable easy use of control switches and easy viewing of display members, as hereinafter described in more detail.

Figures 4, 5:
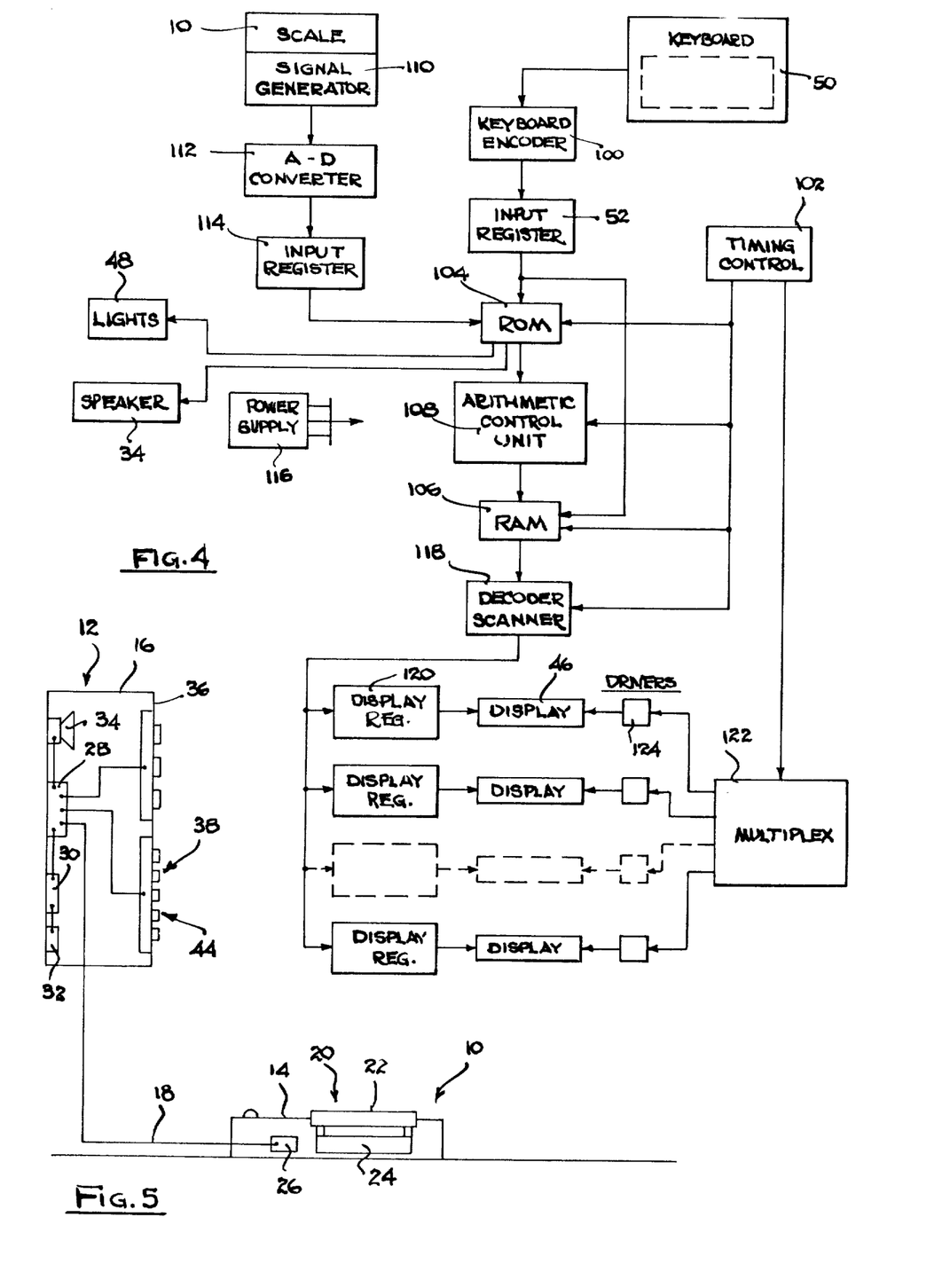
FIG. 4 is a schematic block diagram in greater detail and showing many of the components forming part of the electronic circuitry in the apparatus of the present invention.
FIG. 5 is a schematic side elevational view showing some of the mounting arrangements and operative connections of many of the components forming part of the wall mountable unit and the floor supported scale unit in the apparatus of the present invention.

FIG. 5 illustrates some of the major components forming part of the apparatus of the present invention. The scale unit 10 includes the outer casing 14 much in the same manner as a conventional bathroom type scale. Suitably mounted within the casing 14 is a conventional weight-measuring device 20 which includes a foot platform 22 spring biased upwardly with respect to a weight measuring mechanism 24, the latter of which typically generates an analog of physical movement relating to the weight of the individual, and in a normal bathroom scale would provide an output reading with a needle physically coupled to the mechanism 24. In the case of the present invention, however, a suitable signal generating mechanism 26 is located within the casing 14 and is coupled to the weight measuring mechanism 24 for generating an electrical signal in response to the weight of the individual standing on the plate 22. In this case, it can be observed that the signal generating mechanism 26 is electrically connected to the one or more conductors 18 and thereby to an electronic circuit device 28 mounted within the housing 16.

In the embodiment of the invention as illustrated, the housing 16 also includes a battery 30 or similar source of stored electrical power. In addition, the housing 16 includes an input circuit device 32 which may be adapted to receive an external source of electrical current, as for example, a 110 volt electrical current. In addition, the input circuit device 32 may also be provided with a rectifier for rectifying any DC current in order to permit the electronic circuit 28 to operate on an AC current if desired.

The apparatus may also be constructed so that the battery source of power is a back-up to a line source of power. Thus, for example, if the line source of power should not operate, as a result of a power failure or the like, the battery source of power could be automatically connected so as to prevent a loss of information stored in the memory resulting from such power failure.

The housing 16 may also include a speaker 34 mounted therein for purposes of generating audible sounds, as may be desired. For example, these audible sounds could be sounds in the form of clicks or tones, announcements, pieces of music or congratulatory messages, or other messages for purposes of encouraging an individual using the apparatus A to control weight.

Figure 2:
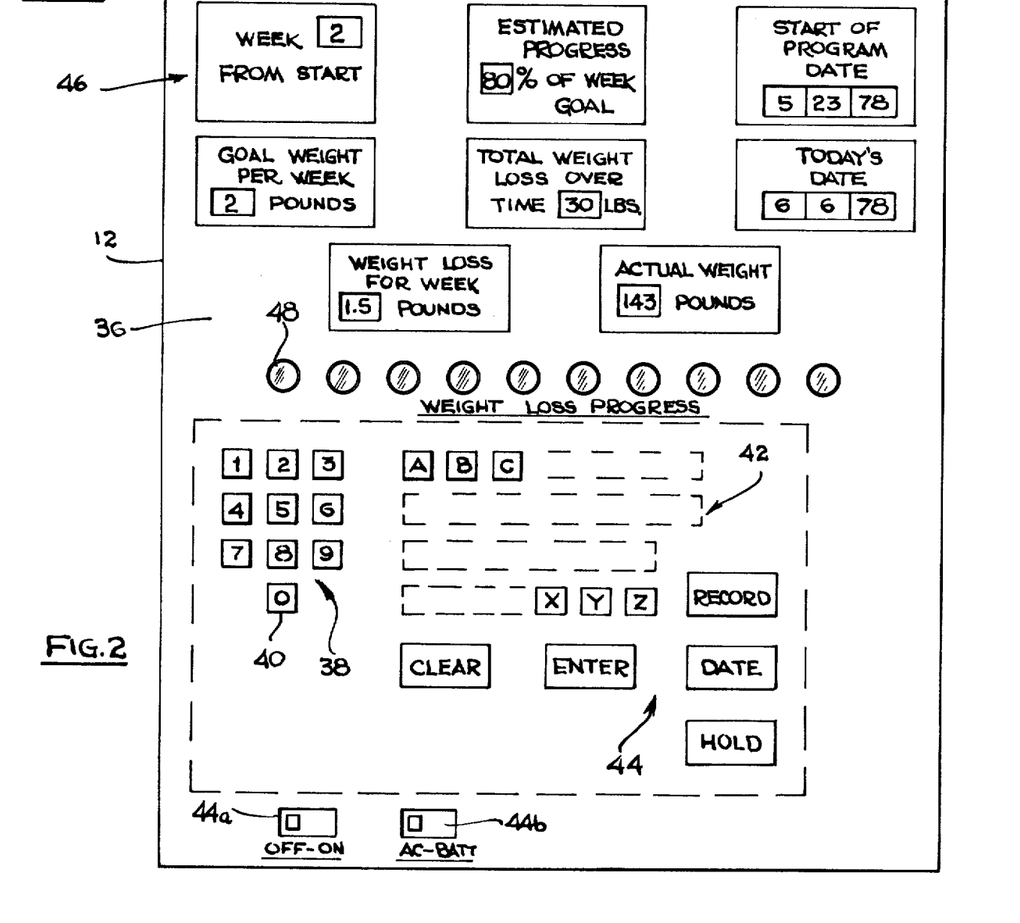
FIG. 2 is a front plan view of the wall mountable unit forming part of the electronic scale apparatus of the present invention.

The outer housing 16 is provided with a face plate 36 thereon. The housing 16 and the face plate 36 could be suitably constructed of various plastics such as polyethylene, polystyrene, polybutadiene, etc. Otherwise, the housing and face plate could be formed of various metals, such as aluminum or other metals. The housing itself is not a unique part of the present invention but merely holds the face plate and various other components forming part of the apparatus therein. Accordingly, the housing itself is neither illustrated nor described in any further detail herein.

The face plate 36 is provided with an input numeric keyboard 38 for introducing data pertinent to weight control in the apparatus A. The keyboard 38 is provided with ten manually operable numeric data input keyboard switches, or so-called "keys" 40 which are designated "1" through "9" and "0" for introducing input data. The face plate 36 is also provided with an alphabetic keyboard 42 containing the switches A through Z for introducing alpha-numeric information if desired. In addition, the input keyboard 36 is provided with certain input function switches designated as 44, and include at least the following switches or keys:

1. A Clear switch—This clear switch is provided for purposes of clearing information which has been initially keyed-in by actuation of the switches, but which may contain an error. Otherwise, and depending upon the specific software logic which is used, the Clear switch could be used to clear certain information contained in the memory of the apparatus as hereinafter described.
2. An Enter switch—This switch is designed to enter information which has been initially keyed-in, by actuation of the switches on the front panel 36, into the memory. Thus, when the enter switch is actuated, information which has been keyed in will be entered into the memory.
3. A Date switch—This switch is designed to introduce a certain date into the apparatus. Thus, by actuating the numeric keyboard 38 and perhaps even the alphabetic keyboard 42, it is possible to enter any desired date into the memory of the apparatus.
4. A Record switch—This switch is typically designed to record certain information in the memory, and which may be generated and obtained by a user standing on the scale device 10. Thus a user standing on the scale device 10 will create a signal representing an input weight and this signal when processed can be stored to represent a weight just measured.
5. A Hold switch—This switch is designed to permit information which may be introduced by way of the scale device 10 or through the manually actuable push-button switches 38 to be held temporarily.

In addition to the above, other function switches, such as an off-on switch 44a and an AC-battery switch 44b may be provided as illustrated on the face plate. In this case, the off-on switch 44a is designed to turn the apparatus off and on. The AC-battery switch 44b is designed to shift the apparatus into a power receiving mode to accept either battery power or otherwise AC power from a conventional outlet, as for example, a 110 volt outlet.

It should be understood that other forms of input switches or function switches or other switches for introducing data could be provided on the apparatus in accordance with the present invention. Some additional function switches which could even operate as display controlling switches could be provided. Some of the function switches could be operated in combination with other function switches or in combination with the data input switches in certain sequences to cause certain functions of the apparatus to be initiated. As indicated previously, the function switches, e.g. an off-on switch and AC-battery switch could be included on the apparatus function switches which could be included on the apparatus. Other function switches which could be included on the apparatus, however, (not shown) are:

1. An "auxiliary print" switch for initiating a printing operation as hereinafter described in more detail;
2. An "auxiliary data input" switch for enabling an auxiliary data input device to be coupled to the apparatus and to operate same;
3. An "auxiliary data output" switch for enabling certain information in the apparatus to be transferred to another storage member for further use and which other storage member may be temporarily interfaced to the apparatus of the present invention.

The above described additional function switches are only exemplary of some of the function switches which could be included on the apparatus.

The apparatus A also includes a plurality of display devices 46. In some cases, the display devices may be single segment display devices, that is devices which display one digit, and in other cases they may be multi-digit display devices. In the embodiment of the apparatus as illustrated, the apparatus A comprises a first display device which displays the number of weeks which have passed from the start of a certain weight control program. A second display device illustrates a goal weight per week in terms of pounds or other weight measures such as gram and/or kilograms which may be controlled by the user. A third display device displays the estimated progress in terms of percentage of a weekly goal or other periodic goal. A fourth display device displays the total weight loss over a period of time. A fifth display device displays the start of the program date and a sixth display device displays the date, such as the present date, in which a user introduces a new weight. A seventh display device displays the weight loss for a week or other periodic interval in terms of pounds. An eighth display device discloses the actual weight in terms of pounds or other weight measure. Here again, it should be understood that other forms of displays could be provided. In each case, the display devices are operated simultaneously or essentially simultaneously. Moreover, each of the displays are initiated automatically. However, it should be understood that the displays could be initiated by the user manually actuating a push-button switch or the like.

In addition to the foregoing, the apparatus also includes a plurality of energizable lights 48 which are mounted on the face plate 36. These energizable lights 48 are connected to the electronic control circuit in order to be energized in a proper sequence or in a proper order in order to display either satisfactory or unsatisfactory results, or otherwise, timing events.

These lights 48 may be wired to the electronic control circuit in such manner that they are operable to provide a desired positive response to the user of the apparatus in the event that a desired weight control reduction or gain has been achieved. The lights 48 may be wired to provide an effect which is encouraging to the user of the apparatus, e.g., for example, to provide a sequence or patterned arrangement of lights which provides a positive stimulus to the user of the apparatus. The lights could be operated in conjunction with the sound to provide the necessary or desired stimulus, e.g., a pin-ball effect wherein the user is stimulated to further activity.

Figure 3:
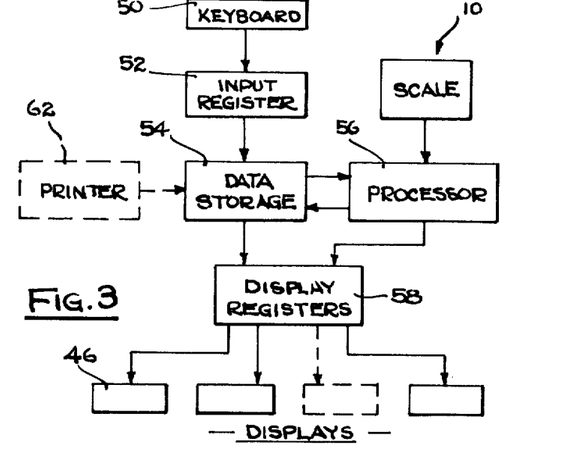
FIG. 3 is a schematic block diagram showing some of the major components forming a part of a microprocessor which may be used in the electronic circuitry in the electronic scale apparatus of the present invention.

FIG. 3 schematically represents some of the major components forming part of the apparatus A of the present invention. Thus, by reference to FIG. 3, all of the keyboard switches generally comprising each of the manually operable push button keys on the face plate 12 and further including all of the other function and input data switches and display switches thereon are represented by reference numeral 50. The keyboard would be provided with a proper keyboard encoding means, hereinafter described in more detail.

The apparatus of the invention, also in its simplified terms, includes an input register means 52 which would actually constitute one or more registers as for example, shift registers. In addition, these registers may adopt the form of certain types of memory units. The input registers are generally designed to hold input data, much in the manner of a buffer storage, for later use in processing the same.

The apparatus also includes, in the simplified format, a data storage means 54 along with a processing means or so-called "processor" 56. In addition the processor receives a signal from the scale after being converted to a digital format. For that matter, the data storage means 54 could be adapted to receive the input from the scale.

The data storage means may again adopt any form of conventional data storage which is commercially available. The same holds true of the processor means 56 in that any of a number of known microprocessors may be operable with the data storage 54 in order to process the data and display the calculated information in a manner as hereinafter described in more detail. One such processor is also hereinafter described in more detail. For that matter, the processor 56 and the data storage means 54 may be part of the same integrated circuit chip.

The apparatus of the invention, also in its simplified terms, includes a display register means having one or more display registers 58. In this case, the display registers are designed to hold and permit generation of electrical signals to the one or more display devices 46 so as to display results as calculated or determined by the illustrated apparatus. Here again, eight such displays are illustrated in FIG. 2. However, it should be understood that FIG. 2 merely is presented in simplified schematic form, but in actuality, any number of individual display devices 46 could be provided.

The display devices are typically shown as multi-segment display devices capable of generating a plurality of individual indicia simultaneously or substantially simultaneously, as for example, numeric indicia, or alphabetic indicia. These displays constitute the primary technique for presenting data introduced into or information calculated by the apparatus of the invention. The displays would differ from a typical calculator display in that weight control information is employed in the preferred apparatus of the invention, and each of the individual displays may serve different purposes as described above.

The data storage or memory unit 54 as indicated above, has a primary purpose of storing data for availability to the processing means and also to an arithmetic control unit as hereinafter described in more detail. The data introduced into the apparatus of the invention may be comprised of a multi-indicia code, that is, one comprised of a plurality of indicia, e.g., numeric indicia. Each indicia or digit or perhaps a group of the indicia or digits will be used to represent or reflect some weight control information.

FIG. 2 also illustrates the possible use of a printer 62 which may be connected to the apparatus of the invention. In this case, the printer is illustrated as being connected to the data storage means 54, although it could be connected to the display registers or some other form of printer interface circuit, also hereinafter described in more detail. The printer 62 would be ideal in many embodiments of the invention to print a copy or so-called hard copy of the information which is displayed. In this case, the printer 62 could either be integral with the apparatus of the invention or mounted thereon, or provided as a separate attachable and detachable unit with means to interface to the apparatus.

As indicated previously, various forms of microprocessors could be available in the form of seven single integrated circuit chips or a single printed circuit chip for use in the apparatus of the invention. For that purpose, the input register 52, the data storage member 54, the processor 56 and the display registers 58 would all be included in a single circuit chip and would all form part of the "microprocessor". In many cases, the microprocessor itself could be separate from these units or include one or more of these units. The term "microprocessor" is used herein and is deemed to include at least the processor 56, the data storage 54, the input register 52 along with the display registers 58.

Figure 6:
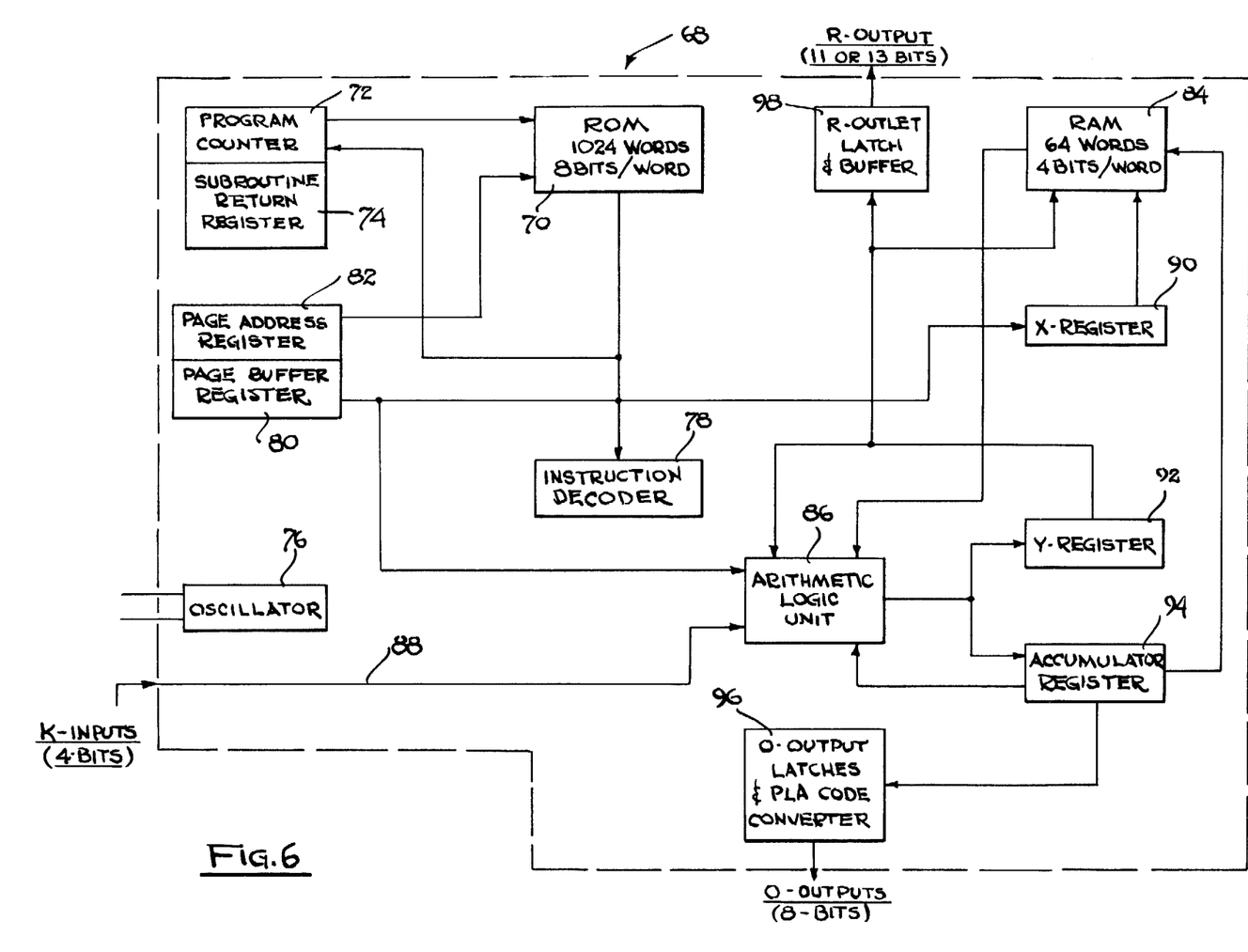
FIG. 6 is a schematic block diagram of one form of microcomputer which may be used in the electronic scale apparatus of the present invention.

FIG. 6 illustrates one form of microcomputer which may be in the form of a single integrated circuit chip and which may be used in the present invention. The microcomputer is designated by reference numeral 68 and comprises a read-only memory, or so-called "ROM" 70 which may contain the storage for the program which is used. This program, of course, would be adapted to perform calculations and provide information with respect to certain weight control information, e.g. the time period since the start of a weight control program, estimated progress, goal weights, weight loss over a period of time, actual weights, percentage of progress and like information.

In one embodiment of the present invention, a microcomputer offered by Texas Instrument Company, and which exists in the form of a single integrated circuit chip designated by the trade name "TMS 100" may be employed as a microcomputer. This particular microcircuit chip is a dedicated chip in which one layer thereof may be suitably programmed with proper program steps in order to perform the various calculations and present the information heretofore described.

The read-only memory 70 operates in conjunction with a program counter 72 and a subroutine return register 74. The program counter 72 and the subroutine register 74 are basically designed to keep track of the instructions introduced into the read-only memory 70. The program counter initiates an input to the read-only memory 70 and the subroutine return register 74 may function as a part of the program counter 72. The subroutine return register is actually used to implement the subroutine calls in the program introduced into the read-only memory 70.

The microcomputer also is provided with a timing circuit 76, in the form of an oscillator, and which generates timing signals for all of the various components illustrated in the circuit chip forming the microcomputer 68. In this case, it should be understood that the various flow lines as illustrated in FIG. 6 actually show the movement of data and do not necessarily describe the actual interconnection of the various components. In this respect, it should be understood that the oscillator 76 would essentially be connected to practically all of the components as illustrated, in order to provide the proper timing signals thereto.

The microcomputer 68 also comprises an instruction decoder 78 which receives an output from the read-only memory 70 and implements specified sequences of connection between the various components forming part of the microcomputer 68. In this respect, the program counter 72 has an output which is connected to the read-only memory 70. Further, outputs of the read-only memory 70 are introduced into a page buffer register 80 which operates in conjunction with a page address register 82, and the latter of which has an input to the read-only memory 70. The page address register 82 and the buffer register 80 are designed to further address and access data which is in the read-only memory 70.

The microcomputer 68 further comprises a random access memory 84 which is used to store variable data quantities used in various operations and which are provided for execution of the program introduced into the read-only memory 70. In this respect, the read-only memory 70 is designed to store 1,024 eight-bit words, and the random access memory 84 is designed to store 64 four-bit words. The microcomputer 68 also comprises an arithmetic logic unit 86 which is designed to receive and operate on data introduced into the read-only memory 70 in accordance with the instructions which have been introduced into the read-only memory 70. The arithmetic logic unit 86 receives data from the read-only memory 70, and further, receives data from the random access memory 84 in the manner as illustrated. In addition, information may be introduced into the microcomputer 68 through an input 88 and which is also provided for introducing information into the arithmetic logic unit 86.

The random access memory 84 operates in conjunction with an X-register 90 and a Y-register 92. The X-register 90 and the Y-register 92 are designed to address locations in the random access memory 84 and to access the memory therein. In addition, an accumulator register 94 operates in conjunction with the random access memory 84 and supplies information thereto. The accumulator register 94 operates to store data used in the execution of the program and further provides information to output latches 96. In addition, the microcomputer 68 is provided with additional output latches 98 which define the "R-outputs". In this respect, the R-outputs are generally 8-bit words. The R-outputs are generally used to control the lights and perhaps any sounds, whereas the O-outputs are used to control other operating features in accordance with the introduced program.

The various components heretofore described as forming part of the microcomputer receive information inputs in the manner as illustrated in FIG. 6. The software program may be embedded in the microcomputer during wafer processing by a single-level mask technique, which in essence defines the fixed read-only memory pattern.

In order to start the sequence of operation, the power to the microcomputer 68 is first initiated by turning on the off-on switch, e.g., the switch 44a. The oscillator 76 will start generating the timing signals for the operation of the microcomputer 68. The program counter 72 then provides location information to enable accessing a certain location in the read-only memory 70 in which the first instruction is obtained. This instruction is then introduced and loaded into the instruction decoder 78, and this, in turn, establishes various instruction paths between the various elements of the microcomputer 68, depending upon the specific instruction itself.

The apparatus of the invention may also be constructed with discrete components as opposed to the use of the microcomputer previously described. In like manner, the apparatus may be constructed with a plurality of circuit chips, each performing one or more of the individual functions. One such arrangement of components which perform the weight control functions of the present invention is more fully illustrated in FIG. 4 of the drawings. In the embodiment of the invention as illustrated in FIG. 4, it should be understood that certain other components may form part of the microcomputer as heretofore described. For example, certain of the components as for example, the read-only memory, an arithmetic control unit, a complements generator, timing circuitry, random access memory, decoders, etc., may all form part of the microcomputer.

In the embodiment as illustrated in FIG. 4, it can be observed that the keyboard 50, the input registers 52 and certain of the other components in FIG. 2 have been illustrated. Located with respect to the keyboard 50 is a conventional keyboard encoder 100 which is actually interposed schematically between the keyboard 50 and the input registers 52.

The manually operable keys or switches and circuit therefor which form part of the apparatus, are connected to the keyboard encoder 100. The keyboard encoder 100 may be an individual unit connected to the keyboard 50, or it may form part of the keyboard 50 and may even be integral therewith. The keyboard encoder 100 may adopt the form of a diode matrix which generally includes a series of diodes (not shown) connected in such fashion as to generate a particular code for bit generation. For example, the keyboard encoder 100 may include a series of diodes connected in such fashion as to generate bits of binary coded decimal (BCD) code so that four bits thereof are equivalent to a decimal digit in the decimal digit system. Other forms of encoders, as for example, capacitive operated encoders, may also be used in the apparatus A of the present invention.

Actuation of any one of the keys on the keyboard 50 or the other function keys representing a decimal digit will cause a generation of four bits in the BCD code to represent that decimal digit. The diode matrix or other form of encoder 100 is well within the design purview of the skilled artisan and is therefore neither illustrated nor described in any further detail herein. However, it should be observed that any other form of code system could be utilized in the apparatus of the present invention. Thus, for example, a two-out-of-six code, or otherwise, e.g., a six-bit gray code, etc., could be employed.

It can be observed that the actuation of any particular switch will identify its input or function. Moreover, each of these keyboard switches in the keyboard 50 may be provided with a so-called "key debounce" feature which prevents double entry of information. This feature is well known in the art and is therefore neither illustrated nor described in any further detail herein. Preferably, in accordance with the present invention, each key in the keyboard which operates as, and may be referred to as a "switch", is preferably a single pole, single throw (SPST) switch.

The keyboard switches which operate the decoding matrix actually may be of a very simple implementation and may include reed, mechanical switches, snap action switches, and the like. An input-sensing program may be employed and should, however, provide protection against transient noise and the double entry as previously described. In addition, the input-sensing program should provide protection against leading-edge bounce and trailing-edge bounce.

As indicated previously, the input register 52 may comprise a plurality of connected registers as for example, registers which receive information in either serial or parallel format. The input register or registers is designed to at least temporarily hold the introduced information which is typically weight control information. The input registers may be under the control of a timing circuit 102 as hereinafter described to transmit the information contained therein for ultimate processing. The input register and particularly a plurality of these input registers may be designed to reorient information or otherwise initially process the information to be in a form where further processing is enabled.

The output of the input register 52 is introduced into a programmed read-only memory 104 and into a random access memory 106. The micro-programmed read-only memory 104 could be connected to a control unit (not shown) to provide input information to the control unit and which is designed to translate the code language used in the apparatus A of the present invention. The read-only memory 104 is essentially a conventional item which is commercially available and would be internally programmed to provide the desired input-output relationships defined herein. In this case, the read-only memory 104 and the random access memory 106 receives an input from the timing control circuit 102 hereinafter described.

A clock pulse generator which is capable of generating clock pulses could form part of the timing control circuit 102 and provides the pulses as an input to the timing control circuit 102. In like manner, this timing control circuit which also functions as a timing distribution circuit, provides pulse time inputs into an arithmetic control unit 108, in the manner as illustrated in FIG. 4 of the drawings.

The lights 48 may also be controlled directly through the ROM 104. In this case the ROM 104 could be programmed to provide a desired energization pattern to give the desired effect, e.g., a pin-ball type effect, as mentioned above. Further, the lights 48 could be of various colors to enhance this effect. The sound generating mechanism which includes the speaker 34 may also be controlled directly through the ROM 104. Here again, the ROM 104 could be programmed to provide the desired sound effects in addition to and perhaps in combination with the generated light effect.

By further reference to FIG. 4, it can be observed that the ROM 104 generates an output to the arithmetic logic unit 108, which in turn, generates an output to and receives an input from the random access memory 106. The random access memory 106 could also receive an input directly from the keyboard encoder 100.

The read-only memory 104 may be programmed with a microprogram and operates the arithmetic control unit 108 to initiate the arithmetic computations. The arithmetic control unit 108 thus could receive instructions from a separate control unit and data from the read-only memory 104 to initiate arithmetic computations on a step-by-step basis. The arithmetic control unit 108 operates in conjunction wih the memory 104 in order to permit proper actuation of the random access memory 106 by generating informational signals to the memory 106 to perform the functions in accordance with the steps selected by the arithmetic control unit 108. The timing control circuit 102, which receives an output from the read-only memory 104, also provides an input to the arithmetic control unit 108, as aforesaid, in order to permit the selection of the proper steps with respect to the data entered into the arithmetic control unit 108. A separate decimal point logic circuit (not shown) could be provided to shift decimal points as data is entered into the random access memory 106.

The signal generating mechanism 26 which is included within the scale unit 10 actually includes a signal generator 110 which is responsive to a movement of the weight measuring mechanism 24. Thus, a signal would be generated in proportion to a movement in the physical member in the weight generating mechanism 24 and thereby provide an analog electrical signal. The generated signal is introduced into an analog digital converter 112 which also forms part of the signal generating mechanism 26. Further, the converted electrical signal may then be introduced into a separate input register 114 associated with the scale device 10. The output of the input register 114 is also introduced into the read only memory 104. In this respect, it should be understood that the analog-digital converter 112 as well as the input register 114, or either of them, could be included within the housing 16 forming part of the display unit 12.

The apparatus may also include an internal power supply 116 as shown in FIG. 4, in addition to or in place of the previously described battery power source. The power supply 116 would be connected to the various components which require a source of electrical power for operation.

Referring again to FIG. 4 of the drawings, it can be observed that the circuitry illustrated includes a display decode circuit comprised at least of a decoder scanner 118. Depending on the design of the random access memory 106, the display decode circuit may include the display registers 120 with the number of display registers being equal to the member of display devices 46. The decoder scanner 118 receives an input from the random access memory 104 and timing signal inputs from the timing control circuit 102 and also generates timing signals for control of the displays.

Each display register 120 would normally be a shift register containing a number of bit positions to accommodate all of the digits to be displayed, and as distributed by the scan decoder 118. The scan decoder 118 generates individual outputs, each of which is associated with an individual display device 120. In the embodiment illustrated in FIG. 1, eight display devices and eight display registers would be utilized in accordance with the present invention. The timing circuit 102 would also generate eight individual timing signals which are introduced into the decode scanner 118 and also a multiplexer 122, forming part of the display decode circuit.

It can be observed that the multiplexer 122 also receives a signal from the random access memory 106. In this case, and in the illustrated embodiment, the random access memory 106 can generate eight parallel outputs, and thus the line to the multiplexer 122 from the random access memory represents eight individual lines. However, the memory 106 could also be designed to provide a serial output, in which case the multiplexer 122 would receive a signal input line carrying the eight individual input signals.

The input multiplexer generates output signals for each of the display devices 46, and which are introduced into decoder drivers 124 forming part of a driving circuit and which, in turn, introduce the necessary input signals into each of the display devices 46. For the embodiment of the invention in FIG. 1 with eight displays, eight separate drivers 124 would be employed.

The display device 46 could adopt the form of cold cathode display tubes. In like manner, the display devices 46 could also adopt the form of light emitting diodes. In either case, the decoder scanner 118 scans all digits to be introduced into the display devices 48 and the data which is introduced from the multiplexer 122 and sequentially presents signals to each of the display devices 48. In essence, the decoder drivers 124 may serve as a power assist for the multiplexer 122 to drive the various display devices 46. Inasmuch as the multiplexer 122 receives a larger number of input lines, particularly in the case of parallel output from the random access memory 106, the multiplexer 122 actually serves as a "demultiplexer".

The decoder driving circuit may actually include both anode drivers and cathode drivers (not shown). The anode drivers would normally include a plurality of outputs, the number of which is equal to the number of display devices 46, and where each one of these outputs is connected to an anode terminal of each such display device 46. In like manner, the cathode output in the decoding driving circuit may be connected in common to the cathode terminals of each of the display devices 46. Moreover, the decoding driver circuit may include an anode register (not shown) which controls the anode drivers and a cathode register (also not shown) which also controls each of the cathode drivers.

While timing signals with respect to the timing control circuit 102 have not been illustrated and described, it should be understood that the generation of timing signals would be conventional. Thus, the timing signals generated would be based on master clock signals as generated by a clock generator and would provide for offset and timing distribution for operation of each of the components. In addition, these timing signals would provide blanking spaces, e.g., to prevent information from being displayed until the proper time, and other forms of display operating signals.

The apparatus could also be designed to include various additional optional components. For example, the apparatus could include an internal timer which is designed to maintain power to all or part of the memory components after the power switch has been turned to the "off" position. After a given time interval has elapsed, the timer would thereupon deactivate the apparatus. This timer would be used to prevent the accidental loss of data and to conserve battery power when the apparatus is not in active use.

Based on the foregoing, it can be observed that the apparatus and the method of the present invention can be highly effective in enabling one to modify behavior in order to control weight. For example, the memory in the scale in the apparatus may be sufficiently large to store an old weight of an individual and other weight related functions of an individual for up to six months or more. This storage of weight related information along with the reinforcement provided for even one-half pound weight change from visual displays of weight loss, as well as through the flashing colored lights and sound generated tones or the like, including, for example, vocal messages which also reinforces the desired attitudes with small periodic weight changes, as for example one or two pound systematic weekly weight changes.

The scale device itself may be sufficiently sensitive so that small decrements of weight change, as for example, weight loss, e.g., one-half pound can be determined and displayed. As a result, an individual on a weight loss program can recognize even a one-half pound weight loss over a period of time, e.g., one week. If this is reinforced, then the same individual may maintain the same control factors and thereby continue the desired weight loss. Thus, the reinforcement as indicated above can arise from the flashing lights on the apparatus and/or messages which may be generated. Typical messages might be, for example, "Congratulations, you have lost one pound in a period of one week" or other similar messages.

The apparatus is highly effective in that it stores a person's weight and advises of weight control information, as for example, lost weight over a real time period. This plus the reinforcement provided by the "electronic pin-ball machine" effect of apparatus itself is highly effective in achieving weight control when combined with reduced calorie intake and/or increased physcial activity.

It has been found that an individual needs a substantial amount of active feedback on his or her progress and also needs encouragement with respect to small weight decrements or otherwise, small weight increments, depending upon the desired direction of weight change. While this may or may not be forthcoming from other individuals, this encouragement clearly is presented by the apparatus itself. Studies have clearly indicated that negative stimuli only discourages a person on a weight change program. Therefore, if weight change is not in the desired direction or if there is no weight change, only the basic weight data will be presented. In other words, no negative stimuli will be displayed. However, it should be understood, that negative stimuli presentation could be programmed in the apparatus, if it subsequently is found to be effective.

In certain programs where weight loss was a desired goal and the weight loss was to be successful and permanent, the goal established was to lose approximately one or two pounds per week at a maximum, inasmuch as rapid weight loss typically results in later rapid weight gain. It has also been found that weight loss of less than one pound per week is usually too small to encourage a person to continue a weight control program. Therefore, an ideal goal is typically one to two pounds per week, depending upon the individual. Further, it has been found in accordance with the present invention, that by focusing on small weight decrements and using the weight as a basic unit of time measurement, a weight conscious person is trained to take a realistic and successful approach to weight problems and experience a feeling of progress.

The illustrated and described apparatus can also be designed so that it is capable of storing weight related information for two or more individuals such that two or more individuals could use the same apparatus during the same time frame in order to conduct a weight control program.

In the illustrated and described embodiment of the apparatus, there are several displays which provide the user with the necessary weight control information. All of the information is either determined by timers included within the circuitry, or otherwise, is calculated for presentation. For example, and in this embodiment, the first display provides the week from the start of the program, as for example, the second week, the second display device displays the estimated progress of a week goal. Thus, for example, if a user desires to lose two pounds per week, and only lost a weight of 1.6 pounds per week, the display would indicate eightly percent of a week's goal. A third display may provide the goal weight per week, as for example, a two pound loss. A fifth display device may provide a total weight loss over a period of time from start of a program, as for example, 30 pounds. A sixth display device may provide the present date in which a user stands on the scale for introducing weight. A seventh display device may provide a weight loss for a particular period of time, as for example, a one week period. An eighth display device may provide the actual weight of the individual in terms of, for example, pounds. In each case, it should be understood that other forms of displays could be presented. As also indicated above, it is possible to provide a print-out from a conventional printer attached to the apparatus which contains all of the displayed information in order to enable the user to maintain a permanent record.

The lights 48 could be programmed so as to light in sequence, or otherwise, in various patterns to generate a form of applause or other form of positive reinforcement. In addition, and as indicated above, the lights could be used in combination with sounds such as messages generated over the speaker 34. For this purpose, the electronic circuit could be provided with the desired memory properly programmed to generate the desired messages. The apparatus could be constructed to provide the "pin-ball machine effect" as aforesaid, and which may become more pronounced as the person reaches a desired weekly goal weight.

The illustrated and described method of the present invention is quite effective in constantly monitoring the most difficult aspect of any weight change program, which may well be the maintenance of achieved weight goal change over selected periods of time, as for example, weekly time intervals. After a desired weight change is obtained, the weekly goal will be "no weight change" with the scale apparatus appropriately programmed with tones, lights and voices to encourage and reinforce each successful week of weight maintenance. In this way, the scale is not merely a simple fascinating electrical aide designed to help an individual stay with a realistic and safe weight. It also functions to aide the individual over a period of time, as for example six months just lose or gain weight. More importantly, the apparatus and the method work to maintain a weight change goal by means of weekly monitoring and reinforcement of the maintenance of weight change status indefinitely.

Any long term association to lights, tunes or voice messages, or the like, may well be slowly forgotten and "adapted out" and thereby lose a measure of its value as a reinforcement. In other words, the lights, the sounds and various messages which may be generated will have a reduced value as reinforcement to the individual after a substantial period of time. In order to counter this effect of lost value, the individual using the apparatus and method of the invention can effectively program there own stimuli to maintain interest and the reinforcing profits of the stimuli.

Another unique aspect of the present invention is the fact the sound or light messages can be programmed to generate greater excitement as one approaches a weekly goal weight. In other words, an increase in stimuli activity occurs as a result of a closer approach to a desired weight change. This of course can be even in small increments, as for example, a one-half pound weight change. For example, a generated stimuli could be as follows:

One-half pound change—one stimuli event
One pound change—two stimuli events
One and one-half pound—five stimuli events
Two pound change—seven stimuli events One particular format which can be used as the basis of the program for use in the electronic scale apparatus and method of the present invention is set forth below.

The user of the apparatus first "keys in", or otherwise, introduces the necessary starting information, often referred to as "baseline data". This includes beginning or current weight of the individual preferably, to a one-half pound accuracy. In this respect, the scale apparatus could be constructed so as to be capable of translating the pounds to a metric system, or the like. This information is then stored, and again, may be stored for up to a year or more in order to meet the requirements of a typical family bathroom scale. The next item of information introduced is the beginning date, which is followed by the weekly weight change desired goal, which again, may be a positive weight change or a negative weight change. Finally, the user introduces the total weight change goal. In all succeeding weighings that is, on each successive occasion when the user weighs himself or herself, the next weight or new weight will compare to this baseline data, over real time. Preferrably the week, 168 hours, is the basic unit of time in order to evaluate any progress.

It is preferable to measure and display one-half pound to about two pounds of weight differential. In order to encourage progress, rather than merely a simple weight loss or weight gain, the scale apparatus is so programmed that it may not acutally provide any weight loss for a specific amount of time, as for example, a real time lapse of seven, twenty-four hour, days. Any use of the scale prior to that time lapse will activate a read-out showing the percentage of weight change of the weekly weight change goal.

On the first weighing, after the baseline information has been introduced, and before the seven days have elapsed, from the start, the following events will take place. First of all, there will be a simultaneous read-out of the start of the program data, as for example, month and day, the present date and the program week, as for example, from one to fifty-two weeks. Next, the percentage of estimated progress to the weight change goal is displayed after a two second delay from the flashing lights at (0.5 second intervals). This may occur with a synchronized beeping tone of pitch and frequency. As a person comes closer to reaching his or her weight change goal for that week, the beeping tone increases proportionally in pitch and in frequency. When a weekly goal weight has been achieved, a pleasant continuous tone may be generated.

The first weighing of the user of the apparatus after the full seven day time lapse or 168 hours, results in a display and experience of the full "pin-ball machine effect". This full effect is preferrably available only once every twenty-four hours, so that with each weighing at any time after the initial seven day period, and after each twenty-four hour weighing, the effect will be provided and the weight change will be presented.

The full effect sequence which is preferrably used in the apparatus is as follows. First of all, there is a simultaneous read-out of the start of the program date, the present date, the program week, as for example, the number of weeks lapsed from the start, the present weekly weight change. This may be accomplished by rising tones of different active timbers. As an example of the display of the weekly weight change and the increments of rising tone, it may be assumed that a person lost two full pounds over a one week period. The weight change for the week would be displayed, perhaps starting with a one-fourth pound increment, and with each additional one-fourth pound increments, to the read-out until the actual weight change for the entire week (two pounds in this example) is displayed. Simultaneously with the weight change increments being displayed or the weight displayed as the case may be, various lights may be flashed in desired sequences accompanied by sounds such as tones generated over the speaker. These would be activiated with increasing rate and with a maximum effect occuring at the two pound weight loss.

As a final event, and after a one and one-half second delay, the total cumulative weight change over time would be presented. Here again, a display of the total weight would be energized in one-fourth units or increments or one-half units or increments. This may occur rapidly and with sound effects presented along with the displayed information. The novel sounds and lights at five and ten pound weight change counts could also be introduced. The scale lights would remain active or energized as long as the individual remains on the scale platform. The sounds and tones would be terminated at the conclusion of the counting sequences.

When an individual has lost over fifty percent of the total goal weight, the first half of the lights would be energized signifying that the person is at least half way to the total goal weight loss. In like manner, when the person has lost sixty percent of his or her total goal weight, then approximately sixty percent of the lights would be energized. This is accomplished in order to remind the person of the progress during weighing time.

It should be understood that the lights 48 could be presented in various colors as for example, red, blue, white and green. Moreover, various banks of these lights 48 could also be provided. Further, the apparatus can be programmed in order to cause the speaker to generate the desired sounds as indicated above. Moreover, it may be programmed by using voice synthesizers to generate words of applause, as for example, "good work", "great" or the like.

Thus, there has been illustrated and described a unique and novel scale apparatus for generating and displaying weight control information and a method of controlling weight utilizing an electronically operable scale apparatus and which therefore fulfills all of the objects and advantages sought therefrom. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention or deemed to be covered by the invention which is limited only by the following claims.

Having thus described my invention, what I desire to claim and secure by Letters Patent is:

1. An electronic scale apparatus for providing weight control information and interacting with an individual using same on a periodic basis by providing weight control encouragement, said apparatus comprising:
 (a) means for measuring weight at sequential selected intervals in time,
 (b) signal generating means operatively connected to the means for measuring, for generating an electrical signal in response to the measured weight at each selected interval,
 (c) memory means for introducing and storing weight information including a base weight and the measured weights at the selected intervals into said memory means and against which a comparison is to be made,
 (d) electronic circuit means operatively connected to the signal generating means for receiving the generated electrical signal of a currently measured weight, said circuit means also being operatively connected to said memory means and capable of calculating a weight change based on a comparison of the base weight previously introduced into said memory means or on a comparison of the measured weight at one or more of the previous selected intervals with the currently measured weight represented by said electrical signal,
 (e) display means operatively connected to said electrical circuit means for numerically displaying the calculated weight change at each measured weight,
 (f) light means including a plurality of individual light elements operatively connected to said electrical circuit means and being energized in a selected arrangement based on a weight differential between a currently measured weight and a previously measured weight or base weight, certain of said light elements generating light having a color different from other of the light elements so that different colored light patterns can be generated, the arrangements of and color patterns created by energization of the various light elements being a function of the amount of weight differential thus measured and being different for certain different weight differentials, said arrangement of energization of said various light elements also being controlled in a selected pattern and color arrangement to provide a desired amount of encouragement to the user of the apparatus as a function of the weight differential, and (g) sound generation means operatively connected to said electrical circuit means and being operable to provide a plurality of selected sounds and in a plurality of selected intensities based on a weight differential between a currently measured weight and a previously measured weight, the particular sounds generated and the intensities of such sounds being a function of the amount of weight differential thus measured and being different for certain different weight differentials, the particular sounds and intensities thereof being generated also being selected to provide a desired amount of encouragement to the user of the apparatus as a function of the weight differential, the generation of sounds and energization of lights being coordinated to create a "pin-ball" type effect representing a certain level of achievement by the user of the apparatus creating an effect of increasing the stimuli to control weight so that the user of the apparatus becomes interactive with the apparatus.

2. The apparatus of claim 1 further characterized in that said housing is provided with a print control circuit for enabling a print mechanism to provide a printed record of weight related information.

3. The apparatus of claim 1 further characterized in that said apparatus comprises a plurality of individual display members capable of being simultaneously operable for simultaneously displaying weight related information.

4. The apparatus of claim 3 further characterized in that one of said display members displays a total weight loss between the currently measured weight and the previous initial base weight, and a second display member displays a weight loss over the period of time between the currently measured weight and the previously measured weight.

5. The apparatus of claim 1 further characterized in that said electronic circuit means, said memory means and said display means are included within a housing separate at least from said means for measuring weight.

6. The apparatus of claim 2 further characterized in that said housing is provided with a plurality of manually actuable input switches for introducing information into said memory means.

7. The apparatus of claim 2 further characterized in that said sound generating means is operatively connected to said circuit means for generating audible messages relating to weight or weight differentials.

8. The electronic scale apparatus of claim 1 for providing weight control information, said apparatus also comprising:
(a) register means operatively connected to the signal generating means for receiving the current weight information, and said memory means is operatively connected to said register means to receive the current weight information, and said data storage means containing a weight history, (b) said memory means comprises at least a read only memory, and
(c) said processing means comprises an arithmetic control unit and a random access memory.

9. The apparatus of claim 8 further characterized in that said apparatus comprises a plurality of manually actuable input switches capable of being manually actuated to introduce weight related information.

10. The apparatus of claim 8 further characterized in that said apparatus comprises:
(a) a scale,
(b) said signal generating means being operatively connected to said scale for generating a signal in a form capable of being received by said memory means and which signal is based on a weight determined by said scale.

11. The apparatus of claim 10 further characterized in that said apparatus is provided with a print control circuit for enabling a print head to provide a printed record of weight related information.

12. An electronic scale apparatus for providing weight control information and interacting with an individual using same on a periodic basis by providing weight control encouragement, said apparatus comprising:
(a) frame means,
(b) means associated with the frame means for providing information on a base weight of an individual using said apparatus or for providing information of one or more previous weight measurements of such individual using said apparatus,
(c) means associated with said frame means for providing current weight information of an individual using said apparatus,
(d) memory means associated with said frame means for storing said base weight of an individual or a weight of said individual based on one or more previous weight measurements of said individual and which weight information is introduced into said memory means and against which a comparison may be made,
(e) electronic processing means associated with said frame means and operatively connected to said memory means, said processing means having an input receiving current weight information of said same individual and making a comparison of said current weight information and said base weight or said current weight information and a previous weight measurement and thereby calculating a weight change based on said comparison,
(f) display means operatively connected to said electronic processing means for numerically displaying the calculated weight change at each measured weight,
(g) light means including a plurality of individual light elements operatively connected to said electronic processing means and being energized in a selected arrangement based on a weight differential between a currently measured weight and a previously measured weight or base weight, certain of said light elements generating light having a color different from other of the light elements so that different colored light patterns can be generated, the arrangement of and color patterns created by energization of the various light elements being a function of the amount of weight differential thus measured and being different for certain different weight differentials, said arrangement of energization of said various light elements also being controlled in a selected pattern and color arrangement to provide a desired amount of encouragement to the user of the apparatus as a function of the weight differential, and
(h) sound generation means operatively connected to said electronic processing means and being operable to provide a plurality of selected sounds based on a weight differential between a currently measured weight and a previously measured weight, the particular sounds generated and the intensities of such sounds being a function of the amount of weight differential thus measured and being different for certain different weight differentials, the particular sounds and intensities thereof being generated also being selected to provide a desired amount of encouragement to the user of the apparatus as a function of the weight differential, the generation of sounds and energization of lights being coordinated to create a "pin-ball" type effect representing a certain level of achievement by the user of the apparatus creating an effect of increasing the stimuli to control weight so that the user of the apparatus becomes interactive with the apparatus.

13. The apparatus of claim 12 further characterized in that said memory means comprises a read only memory and a random access memory.

14. The apparatus of claim 12 further characterized in that said apparatus comprises:
 (a) said means for providing current weight information further comprises means for measuring weight at a selected point in time, and
 (b) signal generating means operatively connected to the means for measuring, for generating an electrical signal in response to the measured weight and which last named means is connected to the means for providing current weight information.

15. The apparatus of claim 12 further characterized in that said electronic processing means comprises an input register means and an arithmetic control unit.

16. The apparatus of claim 12 further characterized in that said apparatus comprises a plurality of individual display members capable of being simultaneously operable for simultaneously displaying weight related information.

17. The apparatus of claim 16 further characterized in that a first display member discloses a total weight loss from the previous initial starting weight and a sound display member discloses a weight loss over a period of time less than that from the starting weight.

18. A method for providing weight control information over a period of time and encouraging a user of the method to control his or her weight by providing a stimuli to the user, said method comprising:
 (a) measuring a base weight of an individual at a selected point in time,
 (b) generating an electrical signal in response to the measured base weight at said selected point in time,
 (c) converting said electrical signal to a form capable of being stored in a digital processing memory means and storing the converted electrical signal to represent a base weight against which a comparison is to be made,
 (d) measuring a new weight of said same individual,
 (e) generating an electrical signal in response to the new weight,
 (f) converting the newly generated electrical signal into a form capable of being processed by a digital processing means,
 (g) comparing the new weight to the base weight and determining a weight differential therefrom,
 (h) displaying the weight differential for the time elapse period from the previous weight measurement to the new weight measurement,
 (i) energizing a plurality of individual light elements in a selected arrangement based on a weight differential between a currently measured weight and a previously measured weight including said base weight, certain of said light elements generating light having a color different from other of the light elements so that different colored light patterns can be generated, the arrangement of and color patterns created by the energization of the various light elements being a function of the amount of weight differential thus measured and being different for certain different weight differentials, said method also controlling the arrangement of energization of said various light elements in a selected pattern and color arrangement to provide a desired amount of encouragement to the user of the apparatus as a function of the weight differential, and
 (j) generating a plurality of selected sounds and in a plurality of selected intensities based on a weight differential between a currently measured weight and a previously measured weight, including the base weight, the particular sounds generated and the intensities of such sounds being a function of the amount of weight differential thus measured and being different for certain different weight differentials, said method further generating the particular sounds and in the intensities thereof to provide a desired amount of encouragement to the user of the apparatus as a function of the weight differential, the generation of sounds and energization of lights being coordinated to create a "pin-ball" type effect representing a certain level of achievement by the user of the method creating an effect of increasing the stimuli to control weight.

19. A method for providing a weight control information over a period of time and encouraging a user of the method to control his or her weight by providing stimuli to the user, said method comprising:
 (a) measuring a base weight of an individual at a selected point in time,
 (b) generating an electrical signal in response to the measured base weight at said selected point in time,
 (c) converting said electrical signal to a form capable of being stored in a digital processing memory means and storing the converted electrical signal to represent a base weight against which comparison is to be made,
 (d) measuring a new weight of said same individual,
 (e) generating an electrical signal in response to the new weight,
 (f) converting the newly generated electrical signal into a form capable of being processed by a digital processing means,
 (g) comparing the new weight to the base weight and determining a weight differential therefrom,
 (h) displaying (1) the weight differential for the time elapse period from the previous weight measurement to the new weight measurement, (2) the number of time elapse periods from a start of a weight control program, (3) a goal weight per time elapse measurement period, (4) the estimated progress as a function of a particular time elapse period goal, (5) the total weight gain or loss over a period of time, and (6) an actual weight of an individual, (i) energizing a plurality of individual light elements in a selected arrangement based on a weight differential between a currently measured weight and a previously measured weight including said base weight, the arrangement of the energization of the various light elements being a function of the amount of weight differential thus measured and being different for certain different weight differentials, said method also controlling the arrangement of energization of said various light elements to provide a desired amount of encouragement to the user of the apparatus as a function of the weight differential, and (j) generating selected sounds based on a weight differential between a currently measured weight and a previously measured weight, including the base weight, the sounds generated being a function of the amount of weight differential thus measured and being different for certain different weight differentials, said method further generating the particular sounds to provide a desired amount of encouragement to the user of the apparatus as a function of the weight differential, the generation of sounds and energization of lights creating an effect of increasing the stimuli to control weight.

20. The method of claim 19 further characterized in that said method also comprises displaying the following: (7) the date of the start of a weight control program, and (8) a present date on which a weight measurement is being made.

21. An electronic scale apparatus for providing weight control information, said apparatus comprising:
(a) means for measuring weight at a selected point in time,
(b) signal generating means operatively connected to the means for measuring, for generating an electrical signal in response to the measured weight,
(c) memory means for storing weight information including a base weight introduced into said memory means and against which a comparison is to be made,
(d) electronic circuit means operatively connected to the signal generating means for receiving the generated electrical signal, said circuit means also being operatively connected to said memory means and capable of calculating a weight change based on a comparison of the base weight previously introduced into said memory means with the weight represented by said electrical signal, and
(e) display means operatively connected to said electrical circuit means for displaying:
(1) the number of time elapse periods from a start of a weight control program,
(2) a goal weight per time elapse period,
(3) the estimated progress as a function of a particular time elapse period goal,
(4) the total weight gain or loss over a period of time,
(5) the weight loss or gain for a particular time elapse period, and
(6) an actual weight of an individual.

22. The apparatus of claim 21 further characterized in that said display means also displays (7) the date of the start of a weight control program, and (8) a present date on which a weight measurement is being made.

23. The apparatus of claim 21 further characterized in that said apparatus comprises:
(1) first display means for displaying the number of time elapse periods from a start of a weight control program,
(2) second display means for displaying the goal weight per time elapse period,
(3) third display means for displaying the estimated progress as a function of a particular time elapse period goal,
(4) fourth display means for displaying the total weight gain or loss over a period of time,
(5) fifth display means for displaying the weight loss or gain for a particular time elapse period, and
(6) sixth display means for displaying an actual weight of an individual.

24. The apparatus of claim 23 further characterized in that said apparatus further comprises:
(7) seventh display means for displaying the date of the start of a weight control program, and
(8) eighth display means for displaying a present date on which a weight measurement is being made.

25. An electronic scale apparatus for providing weight control information and interacting with an individual using same on a periodic basis by providing weight control encouragement, said apparatus comprising:
(a) means for measuring weight at sequential selected intervals in time,
(b) a housing separate from said means for measuring weight,
(c) signal generating means operatively connected to the means for measuring, for generating an electrical signal in response to the measured weight at each selected interval,
(d) memory means in said housing for introducing and storing weight information including a base weight and the measured weights at the selected intervals into said memory means and against which a comparison is to be made,
(e) electronic circuit means in said housing and being operatively connected to the signal generating means for receiving the generated electrical signal based on a currently measured weight, said circuit means also being operatively connected to said memory means and capable of calculating a weight change based on a comparison of the base weight previously introduced into said memory means or on a comparison of the measured weight at one or more of the previous selected intervals with the currently measured weight represented by said electrical signal,
(f) display means operatively connected to said electrical circuit means for numerically displaying:
(1) the calculated weight change at each measured weight for a certain time interval,
(2) the number of time elapse periods from a start of a weight control program,
(3) a goal weight per time elapse period,
(4) the estimated progress as a function of a particular time elapse period goal,
(5) the total weight gain or loss over a period of time, and
(6) an actual weight of an individual,
(g) light means including a plurality of individual light elements operatively mounted on said housing an connected to said electrical circuit means and being energized in a selected arrangement based on a weight differential between a currently measured weight and a previously measured weight or base weight, the arrangement of energization of the various light elements being a function of the amount of weight differential thus measured and being different for certain different weight differentials, said arrangement of energization of said various light elements also being controlled to provide a desired amount of encouragement to the user of the apparatus as a function of the weight differential, and (h) sound generation means operatively connected to said electrical circuit means and being operable to provide a selected sound based on a weight differential between a currently measured weight and a previously measured weight, the sounds generated being a function of the amount of weight differential thus measured and being different for certain different weight differentials, the particular sound being generated also being selected to provide a desired amount of encouragement to the user of the apparatus as a function of the weight differential, the generation of sounds being related to the arrangement for energization of lights, and the generation of sounds and energization of lights creating an effect of increasing the stimuli to control weight.

26. The apparatus of claim 25 further characterized in that said display means further displays:
(6) the date of the start of a weight control program, and
(7) a present date on which a weight measurement is being made.

27. The method of claim 25 further characterized in that said electronic circuit means, said memory means and said display means are included within a housing separate at least from said means for measuring weight.

28. The apparatus of claim 25 further characterized in that said apparatus comprises a plurality of individual display members capable of being simultaneously operable for simultaneously displaying weight related information.

29. The apparatus of claim 25 further characterized in that said display means comprises:
(1) a first display which displays said calculated weight chainge for a certain time interval,
(2) a second display for displaying said number of time elapse periods from a start of a weight control program,
(3) a third display for displaying said goal weight for a time elapse period,
(4) a fourth display for displaying said estimated progress as a function of a particular time elapse goal,
(5) a fifth display for displaying said total weight gain or loss over a period of time, and
(6) a sixth display for displaying said actual weight of an individual.

30. The apparatus of claim 29 further characterized in that said apparatus comprises:
(7) a seventh display for displaying a date of the start of a weight control program, and
(8) an eighth display for displaying a present date on which a weight measurement is being made.

* * * * *